Feb. 28, 1928.

F. DUDA 1,661,034

APPARATUS FOR PHOTOGRAPHING QUICK MOTIONS

Filed May 18, 1926

F. Duda
inventor

By: Marks & Clerk
Attys

Patented Feb. 28, 1928.

1,661,034

UNITED STATES PATENT OFFICE.

FRANZ DUDA, OF VIENNA, AUSTRIA.

APPARATUS FOR PHOTOGRAPHING QUICK MOTIONS.

Application filed May 18, 1926, Serial No. 109,936, and in Austria April 20, 1925.

This invention relates to an apparatus for photographing quick motions, whereby individual phases of the procedure are fixed on a sensitive surface in measurable intervals.

The present invention has for its object to simplify the known methods which operate with rotating diaphragms or the like, the speed of which is to be measured, and to increase the accuracy of measuring.

According to the present invention the apparatus is provided with two optical systems of lenses, of which the first system serves for producing real images (without a screen) of the individual phases of the motion, while the second system is utilized as the object-glass for photographing these real images on a sensitive surface. As a diaphragm for the intermittent photographing of the real images may be employed one or two lamellas, which are secured to a tuning fork in or substantially in the plane of the produced real images and alternately permit and prevent the exposure of the image-area of the sensitive surface according to the known number of oscillations of the tuning-fork.

Figure 1:
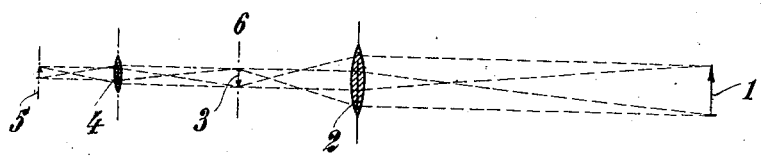

Two modes of carrying out the present invention are illustrated by way of example on the accompanying sheet of drawings in which Fig. 1 is a diagrammatic view of the apparatus according to the invention.

Figure 3:
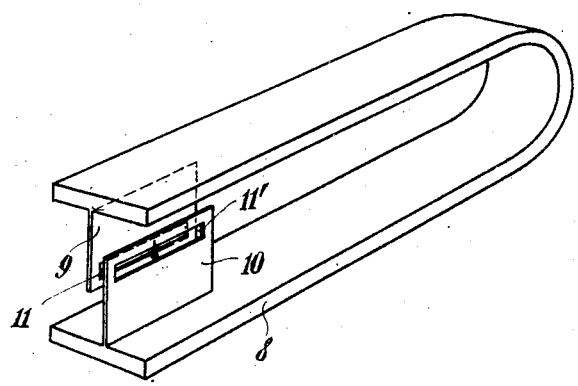
Figure 2:
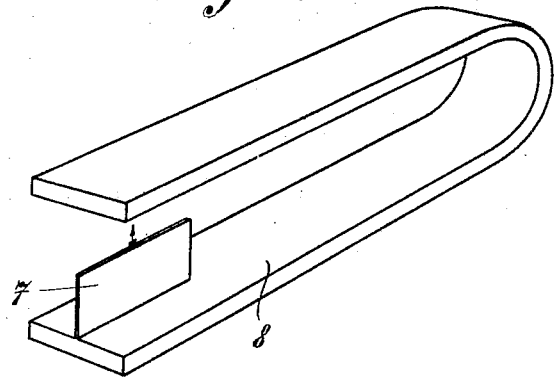

Figs. 2 and 3 are perspective views of two modified arrangements of the lamellas on the tuning-fork.

By means of a system of lenses 2, a number of real images 3 are produced without a screen from a moving object, for instance of a projectile passing through its trajectory and which is indicated by the arrow 1 in Fig. 1. In Fig. 1 only one position of the projectile or one real image is retained. The real images are projected by a system of lenses 4 onto a sensitive surface 5, which either is immovable or can be moved transversely to the optical axis during the photographing. An oscillating diaphragm 6, which alternately uncovers the image-area of the sensitive surface for exposure and covers up the same, is provided in the plane of the real images or close to the same.

As shown in Fig. 2, this diaphragm consists of a lamella 7, which is impermeable to light and secured to the inner face of one prong of a tuning-fork 8 and is disposed vertically with respect to the optical axis. The arrangement is such, that the lamella 7 uncovers the image-area if the tuning-fork is in the position of rest. The systems of lenses together with the sensitive surface are enclosed in a camera. On exciting the tuning-fork the lamella uncovers at intervals the image-area during the passage through the position of rest, the said intervals corresponding to the known number of oscillations of the tuning-fork, whereby a number of images of the object 1 are produced on the sensitive surface. The speed of motion of the object can be determined from the distances between the images by taking into consideration the number of oscillations of the tuning-fork. If the sensitive surface is moved in a transverse direction to the optical axis, a stepped row of images will result, which facilitates the view and prevents any excessive exposure of the sensitive surface.

According to Fig. 3 a lamella 9 and 10 is secured to the inner side of each prong of the tuning-fork. The two lamellas lie to both sides of the real images close to and overlap one another and each lamella is provided with a slot 11 or 11'. In the position of rest of the tuning-fork, the slots coincide with each other, whereby for instance a lens-cover, arranged in front of the lens-system 2, prevents an exposure of the sensitive surface. On exciting the tuning-fork the lamellas cover up the slots and uncover the image-area if the slots are uncovered (passage through the position of rest), whereby the photographing of the real images takes place in double the number of the full oscillations of the tuning-fork.

I claim:—

1. An apparatus for photographing the rapid motion of an object comprising a light-sensitive surface, a pair of optical systems interposed between the moving object and said surface, a diaphragm and means for rapidly oscillating said diaphragm at right angles to the axes of said systems, said diaphragm being disposed between said systems and adapted when oscillated to interrupt the light-rays passing through said optical systems at a relatively high frequency.

2. An apparatus for photographing the rapid motion of an object, comprising a light-sensitive surface, a pair of optical systems interposed between the moving object and said surface, a diaphragm and a tuning fork, said diaphragm being secured to said tuning fork for oscillation therewith and being disposed between and at right angles to the axes of said systems whereby the light-rays passing through said optical systems are interrupted at high frequency when said tuning fork is subjected to vibration.

3. An apparatus for photographing the rapid motion of an object, comprising a light-sensitive surface, a pair of optical systems interposed between the moving object and said surface, a diaphragm, and means for oscillating said diaphragm at right angles to the axes of said systems, said diaphragm being disposed between said systems in the plane of the image produced by the optical system nearest the object, and adapted when oscillated to interrupt the light-rays passing through said optical systems at a relatively high frequency.

4. An apparatus for photographing the rapid motion of an object, comprising a light-sensitive surface, a pair of optical systems interposed between the moving object and said surface, a pair of closely adjacent diaphragms, and means for oscillating said diaphragms in opposite directions at right angles to the axes of said systems, each of said diaphragms being provided with a longitudinal slot and being disposed between said systems, said means comprising vibrating arms for rapidly and periodically aligning and disaligning said slots to interrupt at high frequency light-rays passing through said systems.

In testimony whereof I have signed my name to this specification.

FRANZ DUDA.